United States Patent
Leibowitz et al.

[11] 3,794,994
[45] Feb. 26, 1974

[54] FEEDBACK INTEGRATOR WITH PEDESTAL ELIMINATION

[75] Inventors: Lawrence M. Leibowitz, Fairfax, Va.; Richard K. Baldauf, Greenbelt, Md.

[73] Assignee: The United States of America as represented by the Secretary of the Navy, Washington, D.C.

[22] Filed: June 29, 1972

[21] Appl. No.: 267,316

[52] U.S. Cl............................ 343/5 DP, 343/7 A
[51] Int. Cl............................................. G01s 9/06
[58] Field of Search........................ 343/5 DP, 7 A

[56] References Cited
UNITED STATES PATENTS
3,422,435  1/1969  Cragon et al. ............... 343/17.1 R
3,246,324  4/1966  Price............................... 343/5 DP

*Primary Examiner*—Maynard R. Wilbur
*Assistant Examiner*—G. E. Montone
*Attorney, Agent, or Firm*—R. S. Sciascia; Arthur L. Branning; R. E. O'Neill

[57] ABSTRACT

A digital feedback integrator, especially adapted to provide increased target detection ability in radar systems. The feedback integrator is employed in the signal processing circuitry and compensates for arithmetic truncation errors by advantageously avoiding a final truncation pedestal in the integrating output.

3 Claims, 4 Drawing Figures

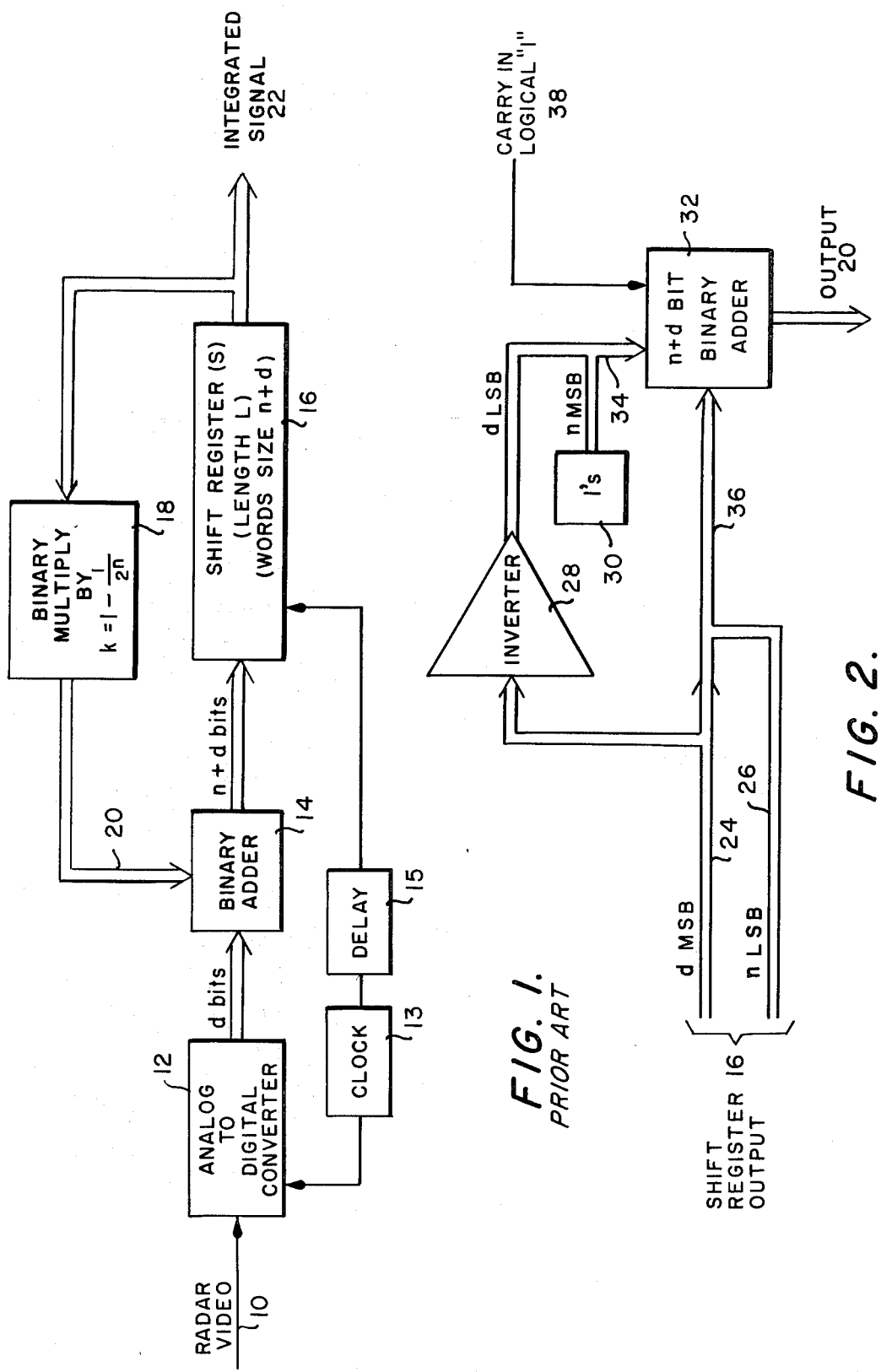

FEEDBACK INTEGRATOR WITH PEDESTAL ELIMINATION

BACKGROUND OF THE INVENTION

Current research in modern radar systems includes, among other things, the development of various special purpose processors. These processors are used to enhance the signal-to-noise ratios in radar return pulses so that the ability to detect a target is increased.

One important processing system of the prior art converts the analog radar video to a corresponding digital word. The digital word is fed to a shift register by way of an adder. The output of the shift register is looped back to the adder by way of a multiplier factor $k<1$. As a result, the digital word is made to slowly decay in an amount proportional to the factor $k$, assuming no other digital words are applied to the adder during that time. Thus, periodic components in the radar video will be integrated (accumulated or averaged) up to a detectable level which is a function of $k$, while the random components such as noise will be averaged to some lower value. Unfortunately however the shift register can never fully clear because of a truncation approximation in the closed loop. As a result, subsequent radar pulses will be exposed to a deleterious pedestal error or a residual in the shift register and the ability to detect small target signals is greatly diminished.

Therefore, with the above drawbacks in mind we have developed a digital feedback integrator system, especially adapted for radar video, which is able to provide digital integration but avoids a round-off pedestal in the integration output.

SUMMARY

A digital feedback integrator for signal processing which utilizes minimum arithmetic and storage circuitry but avoids the pedestal level in the integrator output is presented. As a result, low level radar targets may now be more easily distinguished.

The elimination of pedestal error is accomplished by a modified digital feedback multiplier so that the integrator may decay below a $2^n - 1$ level, where $n$ is a positive integer. The modification includes a binary 1 level subtraction from the integrated level on each succeeding PRF pulse.

OBJECTS OF THE INVENTION

An object of this invention is to provide a minimum form digital feedback integrator.

Another object of this invention is to provide the integrator with pedestal elimination.

A further object of the present invention is to provide an integrator with pedestal elimination by using a minimum amount of circuitry and hardware.

Other objects, advantages and novel features of the invention will become apparent from the following detailed description of the invention when considered in conjunction with the accompanying drawings wherein:

DRAWINGS

FIG. 1 is a block diagram of the prior art digital feedback integrator;

FIG. 2 is a flow diagram of the digital feedback multiplier;

DETAILED DESCRIPTION

Figure 3:
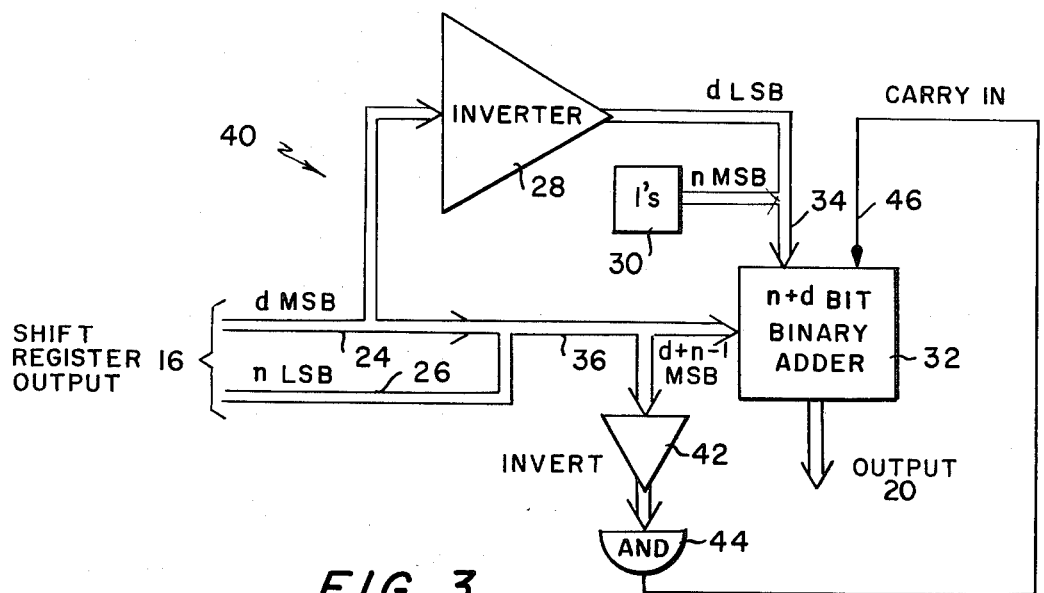
FIG. 3 is a diagram of the feedback multiplier and the circuitry required to provide for pedestal elimination.

Referring to prior art FIG. 1, radar video 10 is presented in the form of analog information to converter 12. The analog-to-digital converter provides a d bit word as a function of the radar video signal amplitude. As the video signal amplitude becomes large the value of the binary word increases to a saturation level maximum. Also, radar return signal corresponding to each PRF pulse transmitted is sampled by the analog-to-digital converter 12 at intervals in time corresponding to the range intervals required by the desired range resolution of the radar. The overall range extent to be processed is represented by the length L of the shift register 16 which corresponds to the total number of range intervals or bins. The output of the analog-to-digital converter for a particular range bin for a given PRF pulse is added (in the binary adder 14) to the output of the shift register 16 multiplied by a factor $k<1$ from binary multiplier 18. The output of the binary adder 14 sequentially applies digital words to the first position of the shift register 16. Periodic components in the radar video will be integrated or accumulated up to some level determined by $k$ while random components such as noise will be averaged to some lower level. Thus, an improvement in the signal-to-noise ratio results in the integrated signal 22. Clock 13 is applied to converter 12 and to register 16 by way of delay 15 to coordinate the timing function.

Since the circuit as shown in FIG. 1 is of a digital nature, k will be only discrete values represented by:

$$1 - 1/2^n; \tag{1}$$

where $n$ is a positive integer. In order to accommodate the accumulated weighted averages, each cell of the length L shift register 16 must contain a word size of at least $n + d$ bits, where $d$ is the digital word size from the output of the analog to digital converter 12. For example, if 8 is chosen for the positive integer $n$ ($k = .996$), and the word size $d$ is chosen to be 4, the required register word size is 12 bits.

Referring to FIG. 2, the circuitry developed for providing the feedback factor of Equation (1) is shown. The digital word L as discussed above, is composed of $n + d$ bits. The $d$ most significant bits (MSB) of the output of the shift register 16 are fed to inverter 28. The inverted information is then applied to $n + d$ bit binary adder 32 as the $d$ Least Significant Bits (LSB) of the adder input with the $n$ MSB applied as logical 1's forming $-1/2^n$ times the integrator output quantity, N. This value, as represented by flow line 34, is added (by adder 32) to the $n + d$ bit output of the shift register from the corresponding range bin in the current radar return to form $N(1 - 1/2^n)$. This sum from adder 32 is added to the corresponding range bin sample from the analog to digital converter 12 in adder 14. Thus, each word in the register 16 represents a weighted sum of successive radar video samples of a particular range bin.

If a slow moving target (i.e., slow as compared to the relative PRF rate) is presented over a single or multiplicity of range bins, the magnitude represented in the corresponding words in the shift register will integrate up to some value depending on the signal level of the target return. When the target is removed, or alternatively the radar beam moves from the target, the magnitude stored in the shift register for those range bins should decay down to the average radar clutter plus a particular noise level. As mentioned above, only $n + d$ bits of arithmetic circuitry and shift register word size are required to compute and store up to the saturation levels of the weighted averages for a range bin. If this $n + d$ bit format is used, a pedestal or d.c. level in the integrator output results since the integrated level is unable to decay below a level representing the quantity $2^n - 1$. This residual amount is due to the truncation approximation required in the digital implementation of the feedback multiplier 18 as described above.

The instant invention, as shown in FIG. 3, permits the implementation of a digital feedback integrator with an $n + d$ bit format that is capable of decay to levels below $2^n - 1$, and thus provides for the elimination of the pedestal in the integrator output. This may be accomplished by modifying the digital feedback multiplier of FIG. 2 so that the carry into the $n + d$ bit binary adder is a logical 0 unless the output of the shift register to be multiplied is representative of a decimal magnitude of 0 or 1.

As shown in FIG. 3, the system 40 is intended to replace the $(1 - 1/2^n)$ binary multiplier 18 in FIG. 1. The $d + n - 1$ MSB of the shift register output are each logically inverted by inverter 42 and then applied to an AND gate 44. The output of AND gate 44 forms the carry into the binary adder and will be a logical 0 unless the output of the shift register 16 is representative of decimal 0 or 1 (all $d + n - 1$ MSB are logical 0). Thus, the output of the multiplier is $N(1 - 1/2^n) - 1$ except when N equals 0 or 1 in which case the binary multiplier output is $N(1 - 1/2^n)$ as in the case without pedestal elmination. This removes any restriction on the decay of the integrator below the $2^n - 1$ level, and elminates the resulting output pedestal.

Figure 4:
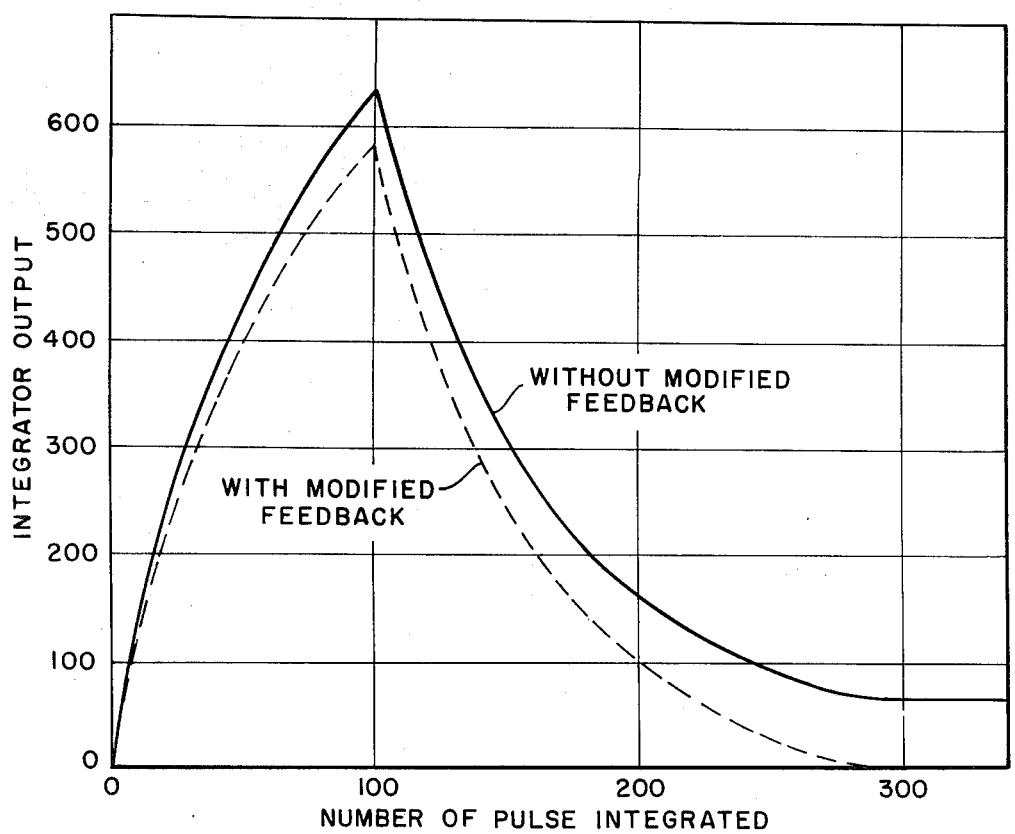
FIG. 4 shows an integrated waveform having a pedestal and a waveform not having a pedestal for an idealized rectangular pulse input ($n = 6$).

The solid line graph of FIG. 4 displays the deleterious pedestal level which is characteristic of the prior art equipment such as that shown in FIG. 1. The removal of the pedestal can be easily seen in FIG. 4 where the dash line graph represents the integrated waveform obtained from the circuit shown in FIG. 3.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In a system for integrating radar video wherein a digital word, corresponding to said video, is applied to a shift register by way of an adder, the output of said shift register being coupled back to said adder by way of multiplier means, the improvement comprising:
    circuit means coupled to said multiplier means for eliminating a truncation pedestal in the integrating system output;
    said circuit means including an $n + d$ bit binary adder means, where $n$ is any positive integer and $d$ is the digital word size such that the integrated output level is able to decay below a level representing the quantity $$2^n - 1.$$

2. The device as claimed in claim 1 wherein said binary adder means includes carry means such that a carry into the $n + d$ bit binary adder means is a logical "0" unless the output of said shift register is representative of a decimal magnitude of 0 or 1.

3. The device as claimed in claim 2 wherein said carry means comprises an inverter means in combination with an AND gate.

* * * * *